US007314298B2

(12) United States Patent
Takagaki et al.

(10) Patent No.: US 7,314,298 B2
(45) Date of Patent: Jan. 1, 2008

(54) AUTOMOTIVE HEADLIGHT DISCHARGE BULB

(75) Inventors: Michio Takagaki, Shizuoka (JP); Takeshi Fukuyo, Shizuoka (JP); Akira Homma, Shizuoka (JP); Shinichi Irisawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 143 days.

(21) Appl. No.: 11/177,360

(22) Filed: Jul. 11, 2005

(65) Prior Publication Data

US 2006/0007696 A1 Jan. 12, 2006

(30) Foreign Application Priority Data

Jul. 9, 2004 (JP) ......................... P. 2004-202821

(51) Int. Cl.
*B60Q 1/00* (2006.01)

(52) U.S. Cl. ...................... 362/538; 362/459; 362/487; 362/507; 362/509

(58) Field of Classification Search ................ 362/538, 362/147, 296, 341, 347
See application file for complete search history.

(56) References Cited

U.S. PATENT DOCUMENTS 5,646,471 A 7/1997 Schöller et al.
5,971,575 A 10/1999 Matubara

FOREIGN PATENT DOCUMENTS

| | | | |
|---|---|---|---|
| JP | 04094001 A | * | 3/1992 |
| JP | 5-251055 A | | 9/1993 |
| JP | 6-163010 A | | 6/1994 |
| JP | 7-211288 A | | 8/1995 |
| JP | 2002-93369 A | | 3/2002 |

* cited by examiner

*Primary Examiner*—Sandra O'Shea
*Assistant Examiner*—Mary Zettl
(74) *Attorney, Agent, or Firm*—Sughrue Mion, PLLC

(57) ABSTRACT

A discharge bulb is provided with an arc tube main body in which an arc tube having a discharge light emitting portion (a hermetically sealed glass envelope) where electrodes are provided in such a manner as to face each other is enclosed in a cylindrical shroud glass tube. The discharge bulb is configured so that a light distribution pattern having a predetermined cut-off line is formed by light intercepting portions (light intercepting films) and a light distribution control reflector. A frost treatment is applied to only a light emitting area on an outer surface of the shroud glass tube which corresponds to an area along the cut-off line in the light distribution pattern.

7 Claims, 11 Drawing Sheets

FIG. 9A1
< SPEC. 1 >
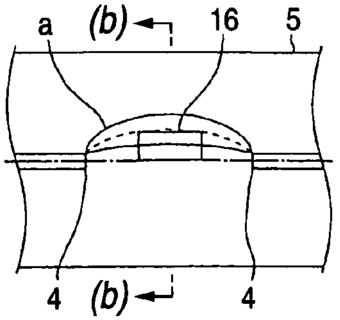
FIG. 9B1
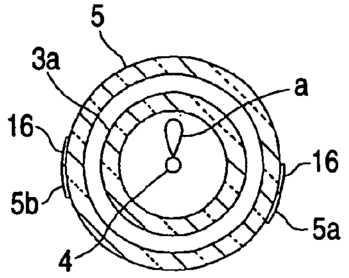
FIG. 9A2
< SPEC. 2 >
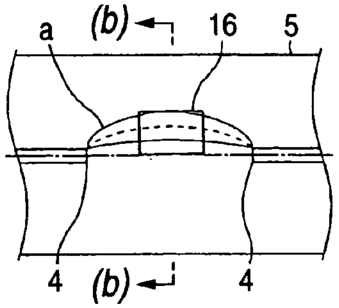
FIG. 9B2
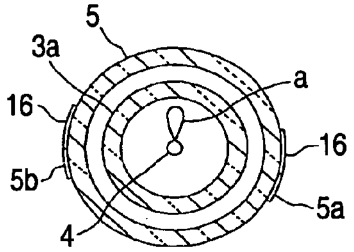
FIG. 9A3
< SPEC. 3 >
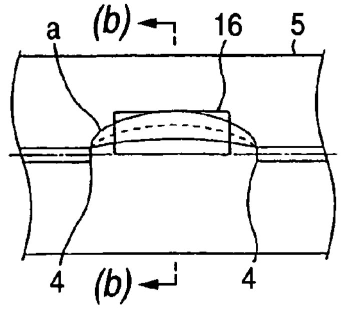
FIG. 9B3
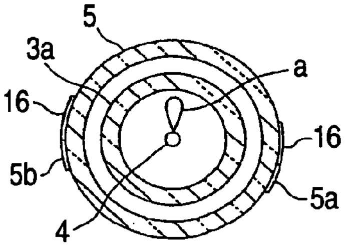
FIG. 9A4
< SPEC. 4 >
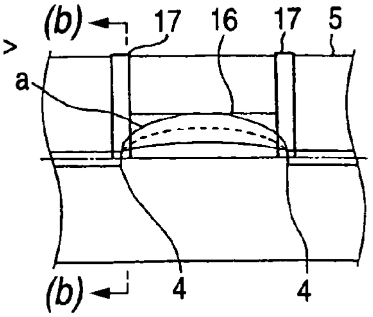
FIG. 9B4
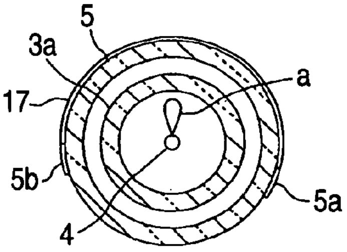

FIG. 10

ARC SHAPES (EACH BEING AVERAGE OF n = 5)

| | DIFFUSING POWER (mm) | BENDING (mm) |
|---|---|---|
| CONVENTIONAL | 0.75 | 0.59 |
| SPECIFICATION 1 | 0.92 | 0.61 |
| SPECIFICATION 2 | 1.08 | 0.58 |
| SPECIFICATION 3 | 1.07 | 0.59 |
| SPECIFICATION 4 | 1.10 | 0.60 |

FIG. 11

LIGHT DISTRIBUTION PERFORMANCE
(EACH BEING AVERAGE OF n = 5)

| | MAX LUMINOUS INTENSITY (cd) | MAX POINT | EFFECTIVE USABLE LUMINOUS FLUX (lm) (45LR-10U, 12D) |
|---|---|---|---|
| CONVENTIONAL | 19322 | 0.82D-2.54L | 1020 |
| SPECIFICATION 1 | 19298 | 0.76D-2.54L | 1014 |
| SPECIFICATION 2 | 19110 | 0.82D-2.58L | 1032 |
| SPECIFICATION 3 | 19186 | 0.74D-2.66L | 1034 |
| SPECIFICATION 4 | 19110 | 0.80D-2.60L | 1060 |

FIG. 12

CUT-OFF LINE DARK PORTIONS (VISIBILITY TESTS: 10 TESTEES)
EVALUATION METHOD;
1 POINT = NOTICEABLE PORTION (VISIBLE PORTION) TO
5 POINTS = UNNOTICEABLE PORTION (INVISIBLE PORTION)

| | A | B | C | D | E | F | G | H | I | J | TOTAL |
|---|---|---|---|---|---|---|---|---|---|---|---|
| CONVENTIONAL | 2 | 1 | 3 | 1 | 2 | 1 | 1 | 2 | 1 | 1 | 15 |
| SPECIFICATION 1 | 4 | 5 | 3 | 4 | 5 | 5 | 4 | 4 | 4 | 4 | 42 |
| SPECIFICATION 2 | 4 | 4 | 5 | 5 | 5 | 5 | 4 | 5 | 5 | 5 | 47 |
| SPECIFICATION 3 | 5 | 4 | 5 | 5 | 5 | 5 | 5 | 4 | 4 | 4 | 46 |
| SPECIFICATION 4 | 5 | 4 | 4 | 5 | 5 | 5 | 5 | 5 | 5 | 5 | 47 |

FIG. 13

LIGHT DISTRIBUTION OSCILLATION (VISIBILITY TESTS: 10 TESTEES)
30Hz, 2G EVALUATION METHOD;
1 POINT = NOTICEABLE OSCILLATION-5POINTS = UNNOTICEABLE OSCILLATION

| | A | B | C | D | E | F | G | H | I | J | TOTAL |
|---|---|---|---|---|---|---|---|---|---|---|---|
| CONVENTIONAL | 1 | 1 | 1 | 3 | 1 | 2 | 2 | 1 | 2 | 1 | 13 |
| SPECIFICATION 1 | 2 | 3 | 2 | 4 | 4 | 3 | 3 | 3 | 3 | 3 | 30 |
| SPECIFICATION 2 | 4 | 4 | 4 | 3 | 3 | 2 | 5 | 5 | 3 | 4 | 37 |
| SPECIFICATION 3 | 4 | 5 | 4 | 4 | 4 | 4 | 5 | 4 | 4 | 5 | 43 |
| SPECIFICATION 4 | 4 | 5 | 5 | 5 | 3 | 4 | 4 | 4 | 5 | 5 | 44 |

FIG. 14

LIGHT DISTRIBUTION IRREGULARITY (VISIBILITY TESTS: 10 TESTEES)
EVALUATION METHOD;
1 POINT = NOTICEABLE IRREGULARITY (IRREGULARITY EXISTS) TO
5 POINTS = UNNOTICEABLE IRREGULARITY (NO IRREGULARITY EXISTS)

| | A | B | C | D | E | F | G | H | I | J | TOTAL |
|---|---|---|---|---|---|---|---|---|---|---|---|
| CONVENTIONAL | 2 | 4 | 3 | 3 | 2 | 1 | 1 | 2 | 2 | 1 | 21 |
| SPECIFICATION 1 | 2 | 3 | 3 | 3 | 3 | 2 | 2 | 1 | 1 | 2 | 22 |
| SPECIFICATION 2 | 5 | 3 | 4 | 3 | 3 | 2 | 2 | 3 | 2 | 3 | 30 |
| SPECIFICATION 3 | 5 | 4 | 4 | 3 | 4 | 4 | 4 | 4 | 4 | 4 | 40 |
| SPECIFICATION 4 | 5 | 4 | 5 | 5 | 5 | 4 | 5 | 4 | 4 | 5 | 46 |

AUTOMOTIVE HEADLIGHT DISCHARGE BULB

The present application claims foreign priority based on Japanese Patent Application No. P.2004-202821, filed on Jul. 9, 2004, the contents of which are incorporated herein by reference.

BACKGROUND OF THE INVENTION

1. Field of the Invention

The present invention relates to an automotive headlight discharge bulb configured so that a light distribution pattern having a predetermined clear cut-off line is formed by a light intercepting portion and a light distribution control reflector when the automotive headlight discharge bulb is used as a light source of an automotive headlight.

2. Related Art

One type of an automotive headlight having a discharge bulb is provided with a parabolic reflector 8 and a discharge bulb 1 as shown in FIG. 5 inserted as a light source in the parabolic reflector 8. The parabolic reflector 8 is accommodated within a lamp compartment defined by a lamp body and a front cover. Light emitted from the discharge bulb 1 is reflected by the reflector 8 so as to form a predetermined light distribution.

As shown in FIGS. 15, 16, the discharge bulb 1 as a light source is provided with an arc tube main body 2 in which a cylindrical shroud glass tube 5 having a UV cutting off function is fused integrally to an arc tube 3. The arc tube main body 2 is integrally assembled to a synthetic resin insulating base 7 so that the arc tube main body 2 is fixed and held so as to extend forward. To be specific, a rear end portion of the arc tube main body 2 is seized and fixed to a front side of the insulating base 7 via a metallic fixture 6*a*. A front end portion of the arc tube main body 2 is supported by a lead support 6*b* extending from the insulating base 7. The lead support 6*b* also constitutes an energizing path.

The arc tube 3 is formed with a hermetically sealed glass envelope 3*a* at substantially a longitudinal center portion of the arc tube 3. Both end portions of the hermetically sealed glass envelope 3*a* is pinch sealed. In the hermetically sealed glass envelope 3*a*, luminous materials (metal halides and mercury and the like) are sealed in together with a starting rare gas. Electrodes 4, 4 are provided in the hermetically sealed glass envelope 3*a* in such a manner as to face each other. Lights are emitted through arc discharge occurring between the facing electrodes 4, 4. As shown in FIG. 15, a pair of left and right light intercepting films 5*a*, 5*b*, which are designated as pinstripes, are provided on an outer surface of the cylindrical shroud glass tube 5 integrally fused to the arc tube 3 so as to intercept part of light traveling toward an effective reflecting surface 8*a* of the reflector 8 to thereby form a sharp clear cut-off line. In addition, a metallic light intercepting shade 9, which is fixed to the reflector 8, is provided around the arc tube 3 fixedly inserted in the reflector 8 so as to intercept direct light attempting to travel forward and light attempting to travel toward other than the effective reflecting surface 8*a* of the reflector 8.

Further, mercury which performs a buffer action is sealed in the hermetically sealed glass envelope 3*a*. However, mercury is a hazardous material which causes the global environmental pollution. Therefore, in recent years, the development of a mercury-free arc tube has drawn attention in which no mercury is sealed in a hermetically sealed glass envelope, as shown in JP-A-2002-093369.

However, in the mercury-free arc tube, there are following problems.

In general, automotive headlights are configured so that a dip beam is formed by an effective reflecting surface (a multiple reflecting surface) 8*a* of a reflector 8. The effective reflecting surface 8*a* is provided on the reflector 8 at least upside of a position where a bulb is disposed. When the effective reflecting surface (a multiple reflecting surface) 8*a* is designed, a light source image (an arc image which is a discharge light emitting portion of an arc tube) is projected (affixed), as shown in FIG. 17, radially about an elbow portion O of a clear cut-off line. However, arc bending becomes large by such an extent that mercury is not sealed in the hermetically sealed glass envelope 3*a*, and a dark portion (refer to shaded portions B in FIG. 18) becomes visible in each light source image (arc image) projected along the clear cut-off line. Hence, there is caused a first problem that the clear cut-off line becomes wavy and does not become rectilinear, whereby visibility is deteriorated by such an extent that the clear cut-off line does not become straight.

In addition, arc becomes thin by such an extent that mercury is not sealed in and arc oscillates due to vibrations generated while the vehicle is running, resulting in a second problem that visibility is deteriorated due to the oscillation of light distribution in which the clear cut-off line oscillates vertically. Furthermore, this causes a third problem that the arc spot formed between the distal ends of the electrodes becomes too bright and hence light distribution irregularity becomes noticeable, whereby visibility is deteriorated further by such an extent that the light distribution irregularity occurs.

Note that the first, second and third problems are not inherent only in the mercury-free arc tubes, and it is said that the conventional mercury sealed in arc tubes had more or less the same problems.

SUMMARY OF THE INVENTION

One or more embodiments of the present invention provides an automotive headlight discharge bulb in which a frost treatment is applied to a shroud glass tube so as to diffuse light emitted from the arc and the arc spot. By the automotive headlight discharge bulb, the arc images and arc spot images projected on (affixed to) a light distribution screen are enlarged and the dark portions of the arcs and the arc spot images become less visible.

One or more embodiments of the present invention provide an automotive headlight discharge bulb which can form a light distribution which is free from the influence of the arc bending.

In addition one or more embodiments of the present invention provide an automotive headlight discharge bulb which can form a light distribution which is free from the influence of the arc spots.

In accordance with one or more embodiments of the present invention, an automotive headlight discharge bulb is provided with an arc tube having a hermetically sealed glass envelope as a discharge light emitting portion where electrodes are provided in such a manner as to face each other, and a cylindrical shroud glass tube that covers the arc tube. In addition, a frost treatment is applied to an area on an outer surface of the shroud glass tube.

In accordance with one or more embodiments of the present invention, the automotive headlight discharge bulb is configured so that a light distribution pattern having a predetermined clear cut-off line is formed by a light intercepting portion and a light distribution control reflector when the automotive headlight discharge bulb is used as alight source of an automotive headlight, and the frost treatment is applied to only a light emitting area on the outer surface of the shroud glass tube which corresponds to an area along the clear cut-off line in the light distribution pattern.

In accordance with one or more embodiments of the present invention, at least one part of the area to which the frost treatment is applied extends so as to face a substantially longitudinal center portion of a curved concavity of an arc generated between the electrodes.

In accordance with one or more embodiments of the present invention, at least one part of the area to which the frost treatment is applied extends so as to face a maximum luminance line of an arc generated between the electrodes.

In accordance with one or more embodiments of the present invention, the area to which the frost treatment is applied is provided to an angular width which is defined by its lower edge defined by a position on the shroud glass tube which corresponds to the clear cut-off line and its upper edge situated from 3 to 20 degrees circumferentially upward from the lower edge.

In accordance with one or more embodiments of the present invention, the area to which the frost treatment is applied is provided on both left and right sides of the shroud glass tube to the same angular width in the circumferential direction.

In accordance with one or more embodiments of the present invention, a frost treatment is also applied to a light emitting area on an outer surface of the shroud glass tube which circumferentially faces to an arc spot appearing at distal ends of the electrodes.

In accordance with one or more embodiments of the present invention, an automotive headlight discharge bulb is provided with an arc tube having a hermetically sealed glass envelope as a discharge light emitting portion where electrodes are provided in such a manner as to face each other, and a cylindrical shroud glass tube which covers the arc tube. In addition, the automotive headlight discharge bulb is configured so that a light distribution pattern having a predetermined clear cut-off line is formed by a light intercepting portion and a light distribution control reflector when the automotive headlight discharge bulb is used as a light source of an automotive headlight, and a frost treatment is applied to only a light emitting area on an outer surface of the shroud glass tube which circumferentially faces to an arc spot appearing at a distal end of each of the electrodes.

Other aspects and advantages of the invention will be apparent from the following description and the appended claims.

Further, according to a first aspect of one or more embodiments of the invention, there is provided an automotive headlight discharge bulb comprising an arc tube having a hermetically sealed glass envelope as a discharge light emitting portion where electrodes are provided in such a manner as to face each other and a cylindrical shroud glass tube which covers the arc tube and configured so that a light distribution pattern having a predetermined clear cut-off line is formed by a light intercepting portion and a light distribution control reflector when used as a light source of an automotive headlight, wherein a frost treatment is applied to only a light emitting area on an outer surface of the shroud glass tube which corresponds to an area along the clear cut-off line in the light distribution pattern.

Then, in the discharge bulb of this type, as a specific configuration of the light intercepting portion for forming a predetermined clear cut-off line, the light intercepting portion is made up of a light intercepting film, which is designated as a pinstripe, provided on an outer surface of the shroud glass tube and/or a metallic light intercepting shade provided between the shroud glass tube and the reflector.

In order to intercept direct light attempting to travel forward and light attempting to travel toward other than the effective reflecting surface (the predetermined effective reflecting surface which contributes to formation of the light distribution of a headlight), while a metallic light intercepting shade is provided around the discharge bulb by, for example, securely attaching it to the reflector, in a case where a light intercepting portion for forming a predetermined clear cut-off line is made up of both a light intercepting film provided on the outer surface of the shroud glass tube and (part of) the metallic light intercepting shade, while (the part of) the metallic light intercepting shade needs to be formed in such a manner as to align with the light intercepting film (forming position) which corresponds to the clear cut-off line, a sharp clear cut-off line is obtained by virtue of the existence of the light intercepting shade (the light intercepting portion) which is located at a position closer to the reflector than the position of the light intercepting film (the light intercepting portion) with respect to the center of discharge.

In addition, in a case where the light intercepting portion for forming the predetermined clear cut-off line by only the light intercepting film (pinstripe) provided on the outer surface of the shroud glass tube, since the metallic light intercepting shade is used only to intercept direct light attempting to travel forward and light attempting toward other than the effective surface area of the reflector (not used as the clear cut-off line forming light intercepting portion), there is involved no troublesome process of disposing the metallic light intercepting shade in such a manner as to align with the light intercepting film (forming position) which corresponds to the clear cut-off line.

In addition, the frost treatment means a treatment for forming embosses (satins) which diffuse emitted light toward the outer surface of the shroud glass tube by sand blasting, laser beam radiation, chemical etching, heating, application of paint or the like.

(Function) While light emitting from the hermetically sealed glass envelope, which is the discharge light emitting portion, is designed such that the light distribution having the predetermined clear cut-off line is formed by the light distribution control reflector and the light intercepting portion (for example, the light intercepting film provided on the outer surface of the shroud glass tube), in designing the effective reflecting surface (multiple reflecting surface) of the reflector, the light source image (the image of the arc which functions as the discharge light emitting portion of the arc tube) is radially projected on (affixed to) the light distribution screen for designing the same, as shown in FIG. 17. Due to this, there is caused a risk that dark portions B appearing on curved recess sides of curved arc images when the images are projected along the clear cut-off line on the light distribution screen continue to one after another, whereby the clear cut-off line becomes wavy (refer to FIG. 18). However, since light emitted from the light emitting area (frost treated area) of the shroud glass tube which corresponds to the area along the clear cut-off line in the light distribution pattern is diffused, arc images A1 that are projected along the clear cut-off line on the light distribution screen are enlarged, as shown in FIG. 7, when compared with the conventional arc images A that are formed by only non-diffused light, and the shape of a dark portion B1 appearing in a curved recess of the enlarged arc image A1 is reduced in area by such an extent that the width of each arc image A1 becomes relatively larger, whereby the resulting clear cut-off line CL approaches a straight state.

In addition, in the event that the area of the frost treatment applied area is too wide, the rectilinear light transmission coefficient of the shroud glass tube is reduced, leading to the reduction in the quantity of light the discharge bulb can emit or the light emitting quantity of the discharge bulb (the light distribution quantity as the headlight). However, since the frost treatment applied area is provided only in the light emitting area on the outer surface of the shroud glass tube which corresponds to the area along the clear cut-off line of the light distribution pattern of the headlight, only the light distribution quantity of the area along the clear cut-off line is slightly reduced, and hence there is caused no reduction in the light emitting quantity of the discharge bulb (the light distribution quantity of the headlight) to such an extent that visibility is affected.

In addition, since the arc image A1 projected along the clear cut-off line on the light distribution screen becomes thicker by such an extent that it is enlarged and moreover, the light distribution quantity of the area along the clear cut-off line on the light distribution screen is slightly reduced, the excessive sharpness of the clear cut-off line is relaxed, and even in the event that the arc oscillates by virtue of vibrations generated while the vehicle is running, a light distribution oscillation becomes invisible in which the clear cut-off line oscillates vertically.

Further, according to a second aspect of one or more embodiments of the invention, there is provided an automotive headlight discharge bulb as set forth in the first aspect, wherein at least part of the area to which the frost treatment is applied extends between the facing electrodes in such a manner as to be square to a substantially longitudinal center portion of a curved concavity of an arc generated between the electrodes.

(Function) Since divided reflecting surfaces of the effective reflecting surface of the reflector which project arc images along the clear cut-off line of the light distribution pattern and areas from which light attempting to travel toward these divided reflecting surfaces are situated on both the left and right sides of the shroud glass tube which extends substantially along a horizontal plane containing a discharge axis, at least a curved recess side of each of the arc images projected along the clear cut-off line on the light distribution screen is enlarged by providing part of the frost treatment applied area at the position which faces square to the substantially longitudinal center portion of the curved recess of the arc in the transverse or horizontal direction, and the width of the arc image so enlarged is enlarged relatively. Due to this, the linearity of the clear cut-off line is enhanced, and the reduction in rectilinear light transmission coefficient of the shroud glass tube is suppressed which occurs in association with unnecessary expansion of the frost treatment applied area, whereby the reduction in light emitting quantity of the discharge bulb is also kept to a slightly low level.

Moreover, according to a third aspect of one or more embodiments of the invention, there is provided an automotive headlight discharge bulb as set forth in the first or second aspect, wherein at least part of the area to which the frost treatment is applied extends in such a manner as to be square to a maximum luminance line of an arc generated between the facing electrodes.

(Function) The position of the maximum luminance line of the arc generated between the facing electrodes is a position of the arc where the luminance is high, and a location corresponding to the maximum luminance line of the enlarged arc that is projected along the clear cut-off line on the light distribution screen is at least enlarged, whereby the light quantity of the enlarged arc image is smoothed out.

Moreover, according to a fourth aspect of one or more embodiments of the invention, there is provided an automotive headlight discharge bulb as set forth in any of the first to third aspects, wherein the area to which the frost treatment is applied is provided to an angular width which is defined by its lower edge defined by at least a position on the shroud glass tube which corresponds to the clear cut-off line and its upper edge situated 3 degrees or greater and 20 degrees or smaller circumferentially upward from the lower edge.

(Function) When the upper edge position of the frost treatment applied area exceeds the upper limit of 20 degrees, the light distribution quantity at an area which exceeds the area extending along the clear cut-off line is reduced by such an extent that the area of the frost treatment applied area is increased, and visibility is reduced. On the other hand, in the event that the upper edge position of the frost treatment applied area is smaller than the lower limit of 3 degrees, the whole of the arc image that is projected along the clear cut-off line of the light distribution pattern (in particular, the curved recess side of the enlarged arc image) is not enlarged sufficiently, and the width of each enlarged arc image is not increased so much, there being provided no effectiveness in making the clear cut-off line approach the straight state.

In addition, since light emitted from a position below the position on the shroud glass tube which corresponds to the clear cut-off line is light that is intercepted by the light intercepting portion (the light intercepting film and/or the light intercepting shade) for forming the clear cut-off line so as not to contribute at all to the formation of the light distribution of the headlight, while there is caused no problem even in case the lower edge of the frost treatment applied area is made to be situated below the clear cut-off line corresponding position on the shroud glass tube, the area needing the frost treatment can be reduced by making the clear cut-off line corresponding position coincide with the lower edge of the frost treatment applied area.

Moreover, according to a fifth aspect of one or more embodiments of the invention, there is provided an automotive headlight discharge bulb as set forth in any of the first to fourth aspects of the invention, wherein the area to which the frost treatment is provided on both left and right sides of the shroud glass tube to the same angular width in the circumferential direction.

(Function) While a headlight specified by a light distribution pattern for left-hand traffic and a headlight specified by a light distribution pattern for right-hand traffic differ from each other in the form (shape) of a light intercepting portion (a light intercepting film and/or a light intercepting shade) for forming a clear cut-off line such that (the shapes of) clear cut-off lines of the light distribution patterns of the respective headlights become symmetrical transversely, by making the angular widths of the frost treatment applied areas provided on both the left and right sides of the shroud glass tube the same in the circumferential direction, a discharge bulb inserting and attaching position is allowed to deviate through a predetermined angle in the circumferential direction to be aligned with bulb inserting and attaching holes in the headlights of the respective specifications, whereby the discharge bulb can be so inserted and attached in the headlights of the respective specifications as a light source only by shifting the discharge bulb inserting and attaching position is made to so deviate.

Moreover, according to a sixth aspect of one or more embodiments of the invention, there is provided an automotive headlight discharge bulb as set forth in any of the first to fifth aspects, wherein a frost treatment is also applied to a light emitting area on an outer surface of the shroud glass tube which faces circumferentially square to an arc spot appearing at distal ends of the electrodes.

(Function) While a location referred to as an arc spot where the luminance becomes very high appears at the distal ends of the facing electrodes at the time of arc discharge, since light emitted from the light emitting area (the frost treatment applied area) on the shroud glass tube which faces square to the arc spot in the circumferential direction is diffused, arc sport portions of all the arc images projected on the light distribution screen are enlarged, and the luminance thereof is reduced, the arc spot portions becoming less noticeable in the light distribution pattern, whereby the resulting light distribution is free from light distribution irregularities.

In addition, since the frost treatment applied area which functions to enlarge the arc spots of the arc images projected on the light distribution screen is limited to the area on the outer surface of the shroud glass tube which faces circumferentially square to the arc spot appearing at the distal ends of the electrodes, only the light distribution quantity at the arc spot locations of all the projected arc images is reduced, and there is caused no reduction in the light emitting quantity of the discharge bulb (the light distribution quantity of the headlight) which affects visibility.

Moreover, according to a seventh aspect of one or more embodiments of the invention, there is provided an automotive headlight discharge bulb comprising an arc tube having a hermetically sealed glass envelope as a discharge light emitting portion where electrodes are provided in such a manner as to face each other and a cylindrical shroud glass tube which covers the arc tube and configured so that a light distribution pattern having a predetermined clear cut-off line is formed by a light intercepting portion and a light distribution control reflector when used as a light source of an automotive headlight, wherein a frost treatment is applied to only a light emitting area on an outer surface of the shroud glass tube which faces circumferentially square to an arc spot appearing at a distal end of each of the electrodes.

The specific configuration of the light intercepting portion which forms the predetermined clear cut-off line and the definition of the frost treatment applied on the outer surface of the shroud glass tube have already been described with respect to the first aspect of the invention, and therefore, the repetition of the same description will be omitted here.

(Function) In addition, the relationship between the light distribution control reflector and the light intercepting portion and the light distribution of the headlight is the same as the configuration described with respect to the first aspect of the invention, and the effective reflecting surface (multiple reflecting surface) of the reflector is designed by projecting (affixing) light sources (images of the arc which functions as the discharge light emitting portion of the arc tube) radially about the elbow portion O of the clear cut-off line on the light distribution screen in front of the reflector. Due to this, at the time of arc discharge, the location referred to as the arc spot where the luminance is very high appears at the distal ends of the facing electrodes (the end portions of the arc) appears as the arc spot at end portions of each arc image projected on the light distribution screen. However, since the light emitted from the light emitting area (the frost treatment applied area) of the shroud glass tube which circumferentially faces square to the arc spot is diffused, the arc spot portions of all the arc images projected on the light distribution screen are enlarged, and the luminance thereof is reduced, resulting in the light distribution in which the arc spots becomes less noticeable or visible in the light distribution pattern (which is free from light distribution irregularities).

In addition, while in the event that the area of the frost treatment applied area becomes too wide, the rectilinear light transmission coefficient of the shroud glass tube is reduced, leading to the reduction in light emitting quantity of the discharge bulb (the light distribution quantity of the headlight), since the frost treatment applied area is limited to the light emitting area on the outer surface of the shroud glass tube which circumferentially faces square to the arc spots, only the light distribution quantity at the arc spot locations of all the projected arc images, and there is caused no reduction in the emitting light quantity of the discharge bulb (the light distribution quantity of the headlight) which affects visibility.

BRIEF DESCRIPTION OF THE DRAWINGS

FIG. 9A1 is a partially enlarged view of the arc tube main body wherein a frost treatment is applied according to specifications 1.

FIG. 9B1 is a cross-sectional view taken along the line (b)-(b) in FIG. 9A1.

FIG. 9A2 is a partially enlarged view of the arc tube main body wherein a frost treatment is applied according to specifications 2.

FIG. 9B2 is a cross-sectional view taken along the line (b)-(b) in FIG. 9A2.

FIG. 9A3 is a partially enlarged view of the arc tube main body wherein a frost treatment is applied according to specifications 3.

FIG. 9B3 is a cross-sectional view taken along the line (b)-(b) in FIG. 9A3.

FIG. 9A4 is a partially enlarged view of the arc tube main body wherein a frost treatment is applied according to specifications 4.

FIG. 9B4 is a cross-sectional view taken along the line (b)-(b) in FIG. 9A4.

FIG. 10 is a drawing showing shapes (diffusion distances and bending) of arc images according to Specifications 1 to 4, respectively.

FIG. 11 is a drawing showing light distribution performances (maximum luminous intensity, maximum light intensity position, effective usable luminous flux) according to Specifications 1 to 4.

FIG. 12 is a drawing showing evaluation results of dark portions of clear cut-off lines according to Specifications 1 to 4, respectively.

FIG. 13 is a drawing showing evaluation results of light distribution oscillations according to Specifications 1 to 4, respectively.

FIG. 14 is a drawing showing evaluation results of light distribution irregularities according to Specifications 1 to 4, respectively.

DESCRIPTION OF THE PREFERRED EMBODIMENTS

Embodiments of the invention will be described with reference to the accompanying drawings.

Figure 1:
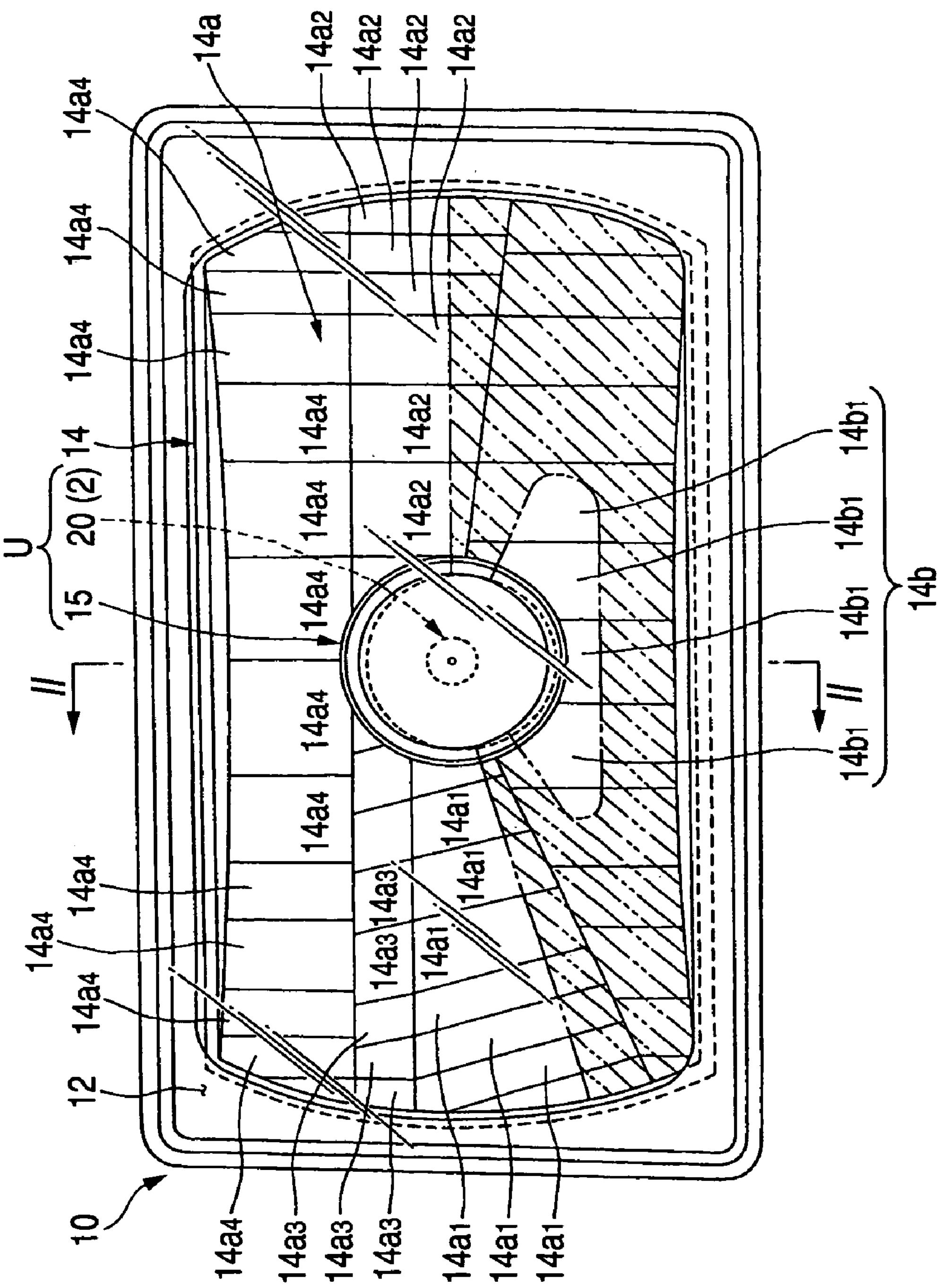
FIG. 1 is a front view of an automotive headlight to which a discharge bulb according to one or more embodiments of the invention is applied as a light source.
Figure 2:
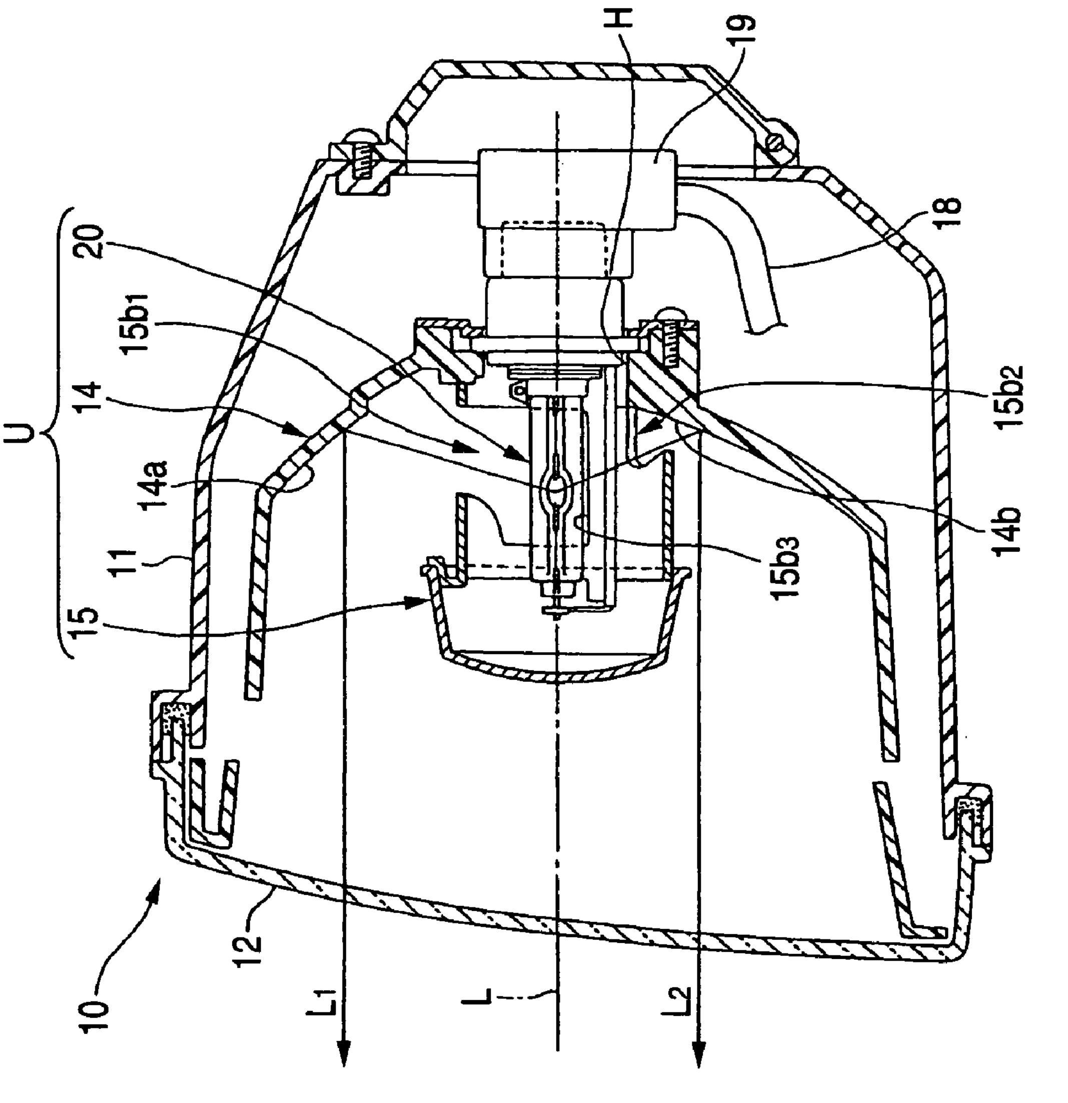
FIG. 2 is a vertical sectional view of the headlight (a vertical view taken along the line II-II in FIG. 1).
Figure 3:
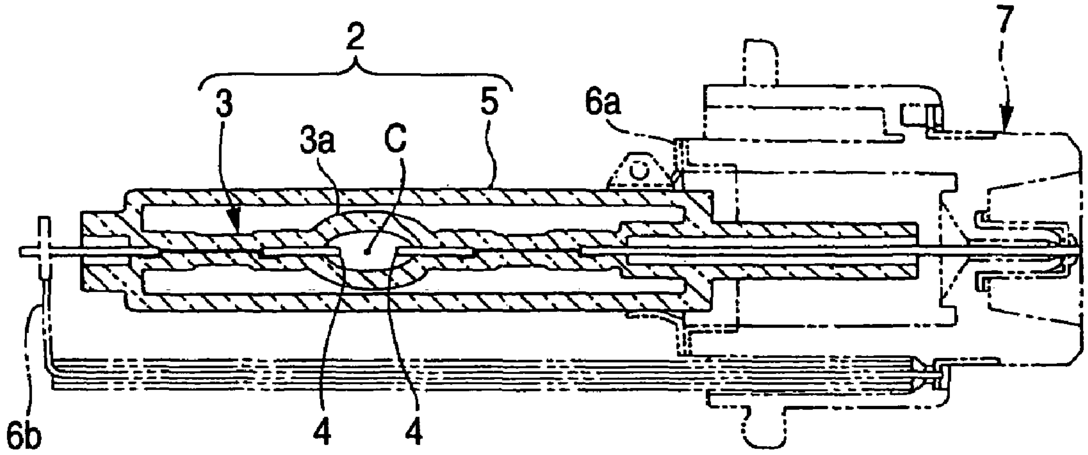
FIG. 3 is a vertical sectional view of the discharge bulb.
Figure 4:
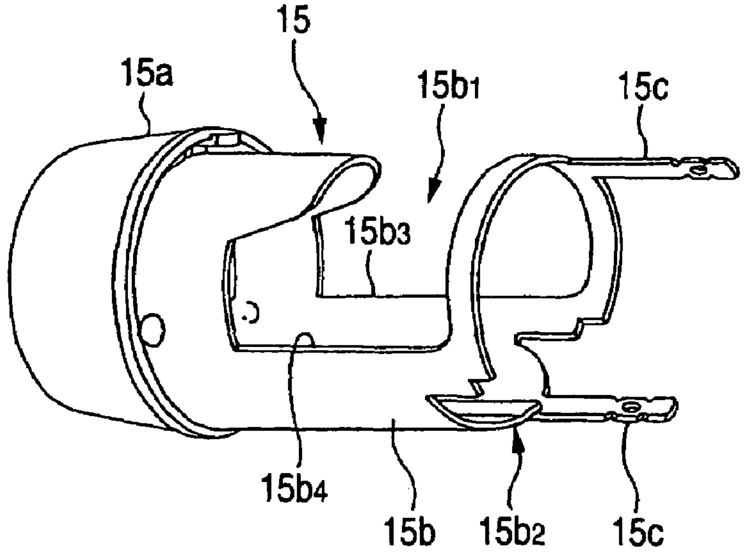
FIG. 4 is a perspective view of a light intercepting shade.
Figure 5:
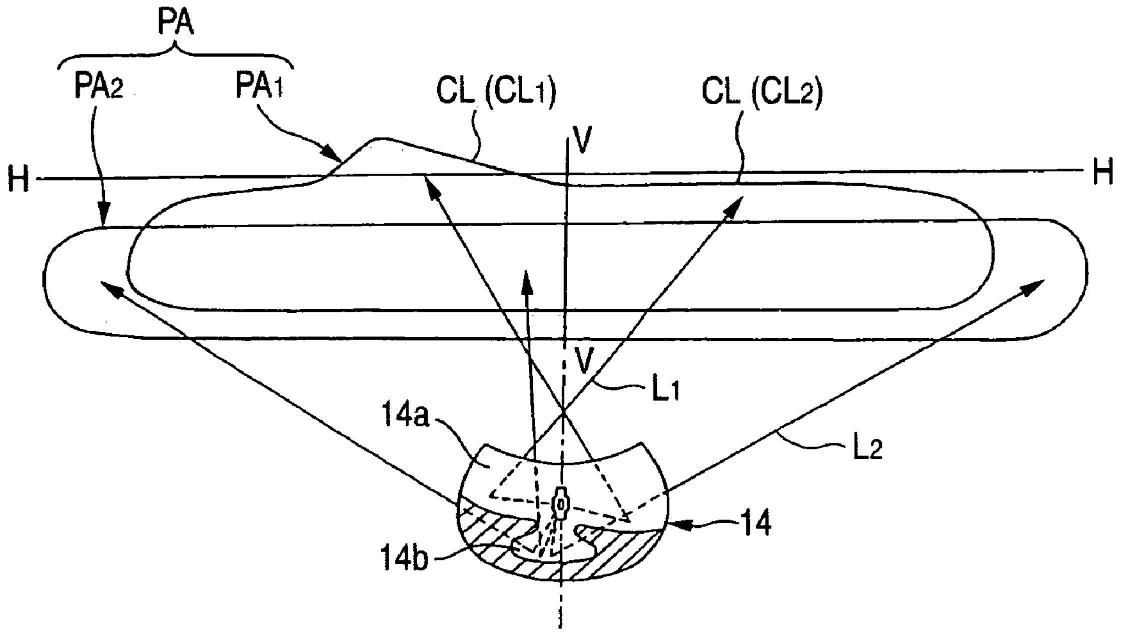
FIG. 5 is a drawing showing a light distribution pattern of the headlight.
Figure 6:
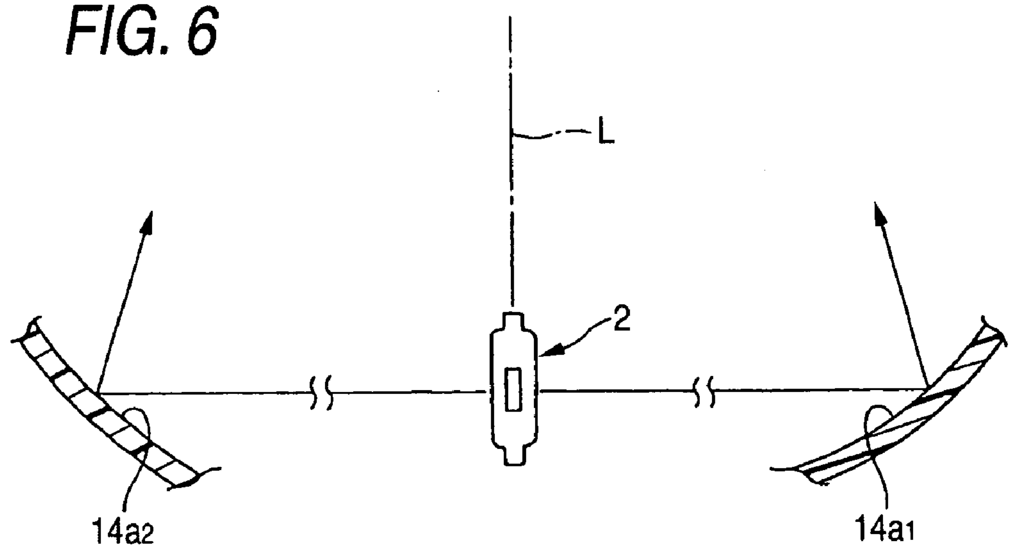
FIG. 6 is a horizontal sectional view which includes a discharge axis of an arc tube in a light source unit.
Figure 7:
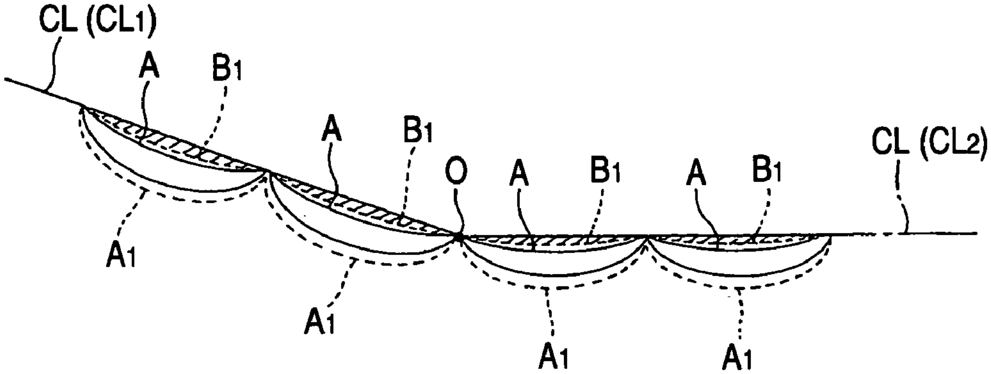
FIG. 7 is a partially enlarged front view of an area extending along a clear cut-off line of the light distribution pattern.
Figure 8A:
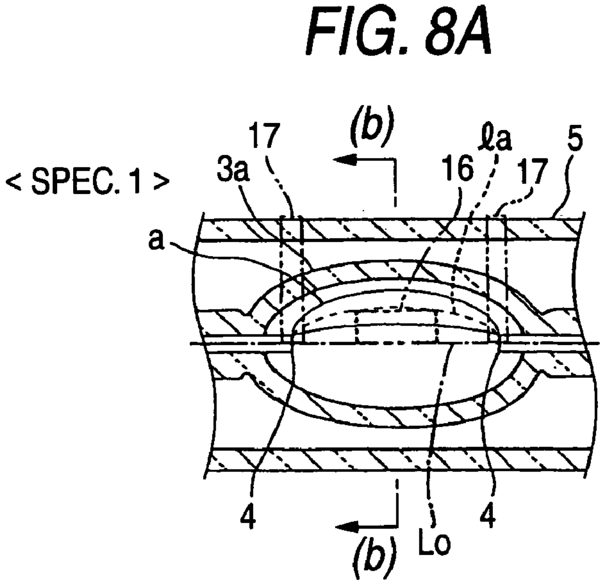
FIG. 8A is a longitudinal sectional view of the arc tube main body, showing a position and size of a frost treatment applied area on the shroud glass.
Figure 8B:
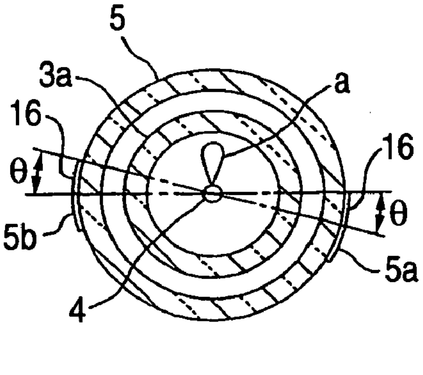
FIG. 8B is a sectional view taken along the line (b)-(b) in FIG. 8A.

FIGS. 1 to 14 show one or more embodiments of the invention. FIG. 1 is a front view of an automotive headlight to which a discharge bulb according to one or more embodiments of the invention is applied as a light source. FIG. 2 is a vertical sectional view of the headlight (a vertical view taken along the line II-II in FIG. 1). FIG. 3 is a vertical sectional view of the discharge bulb. FIG. 4 is a perspective view of a light intercepting shade. FIG. 5 is a drawing showing a light distribution pattern of the headlight. FIG. 6 is a horizontal sectional view which includes a discharge axis of an arc tube in a light source unit. FIG. 7 is a partially enlarged front view of an area extending along a clear cut-off line of the light distribution pattern. FIGS. 8A and 8B are drawings showing the position and size of a frost treatment applied area that is to be provided on a shroud glass tube. FIGS. 9A1 to 9B4 show specifications 1 to 4 which are different in position and size of the frost treatment applied area. FIG. 10 is a drawing showing shapes (diffusion distances and bending) of arc images according to the specifications 1 to 4, respectively. FIG. 11 is a drawing showing light distribution performances (maximum luminous intensity, maximum light intensity position, effective usable luminous flux) according to the specifications 1 to 4. FIG. 12 is a drawing showing evaluation results of dark portions of clear cut-off lines according to the specifications 1 to 4, respectively. FIG. 13 is a drawing showing evaluation results of light distribution oscillations according to the specifications 1 to 4, respectively. FIG. 14 is a drawing showing evaluation results of light distribution irregularities according to the specifications 1 to 4, respectively.

In FIGS. 1 and 2, reference numeral 10 denotes an automotive headlight to which a discharge bulb is applied to as a light source. The automotive headlight 10 is constructed such that alight source unit U in which a discharge bulb 20, which functions as a light source, and a light intercepting shade 15 are integrated into a reflector 14 is accommodated in a lamp compartment defined by a lamp body 11 and a transparent lens cover 12, so that a dip beam forming light distribution pattern PA (PA1, PA2) is formed as shown FIG. 5. In addition, an aiming mechanism, not shown, is interposed between the lamp body 11 and the light source unit U (the reflector 14) so as to tilt and swing adjust an optical axis of the light source unit U (an optical axis of the headlight) in vertical and horizontal directions (to adjust the light distribution pattern PA shown in FIG. 5 in the vertical and horizontal directions).

As shown enlarged in FIG. 3, in the discharge bulb 20, an arc tube main body 2 in which a cylindrical shroud glass tube 5 having a UV cutting off function is fused integrally to an arc tube 3 is integrally assembled to a synthetic resin insulating base 7, whereby the discharge bulb 20 is fixed and held as a form which extends forward. To be specific, a rear end portion of the arc tube main body 2 is seized and fixed to a front side of the insulating base 7 via a metal fixture 6*a*, and a front end portion of the arc tube main body 2 is supported by a lead support 6*b* extending from the insulating base 7, the lead support 6*b* also functioning as an energizing path. Then, the discharge bulb 20 is inserted in a bulb inserting and attaching hole H provided in a rear crest portion of the reflector 14 for attachment in place so as to be integrated with the light source unit U.

Figure 15:
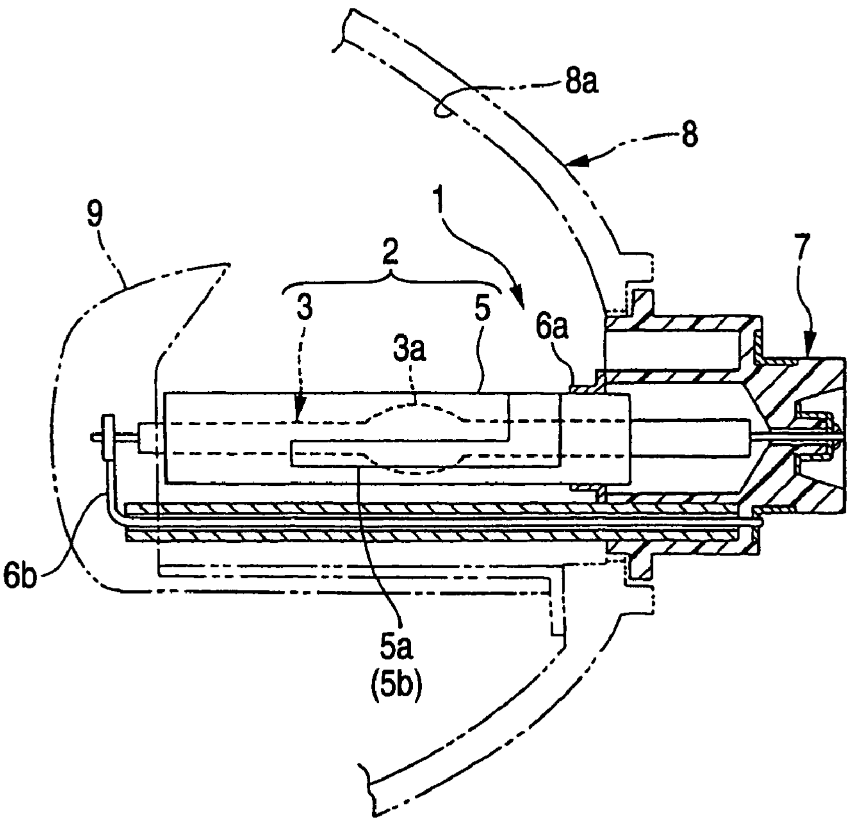
PRIOR ART FIG. 15
FIG. 15 is an enlarged sectional view showing the periphery of a reflector installed in a conventional discharge valve.
Figure 16:
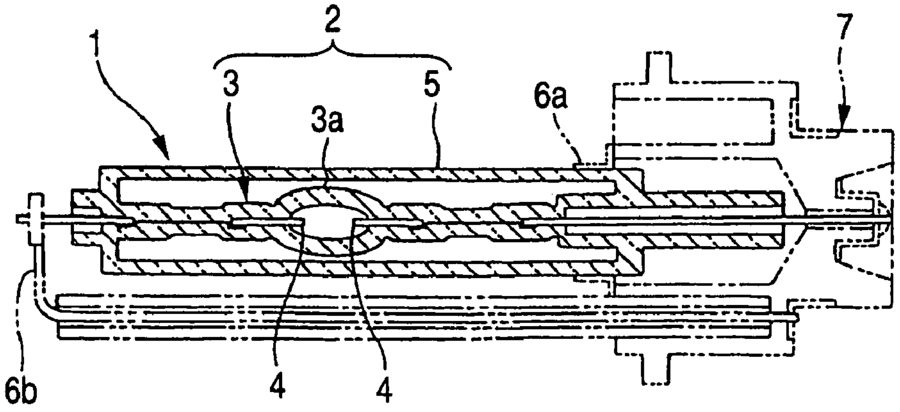
PRIOR ART FIG. 16
FIG. 16 is an enlarged longitudinal sectional view of the same bulb.

The arc tube 3 is pinch sealed at both end portions thereof so as to form at substantially a longitudinal center portion thereof a hermetically sealed glass envelope 3*a* in which luminous material (metal halides and the like) and a buffer material which replaces mercury are sealed in together with a starting rare gas and electrodes 4, 4 are provided in such a manner as to face each other (a mercury-free arc tube), whereby lights are emitted through arc discharge occurring between the facing electrodes 4, 4. As shown in FIG. 15, intercepting films 5*a*, 5*b* (refer to FIGS. 8(*b*) and 15), which are designated as pinstripes, are provided on an outer surface of the cylindrical shroud glass tube 5 which is integrally fused to the arc tube 3 so as to intercept part of light traveling toward effective reflecting surfaces 14*a*, 14*b* of the reflector 14 to thereby form a sharp clear cut-off line CL (a 15-degree cut-off line CL1 and a horizontal cut-off line CL2).

In addition, a metallic light intercepting shade 15 (refer to FIGS. 2, 4) is provided around the arc tube 3 so as to intercept direct light attempting to travel forward and light attempting to travel toward other than the effective reflecting surfaces 14*a*, 14*b* of the reflector 14. Namely, the light intercepting shade 15 is, as shown in FIG. 4, made up of a light intercepting cap 15*a* which is located at a front end portion thereof to intercept direct light attempting to travel forward, a central light intercepting cylindrical portion 15*b* which intercepts light attempting to travel toward other areas than the effective reflecting surfaces 14*a*, 14*b* of the reflector 14 and leg portions 15*c* which are provided at a rear end portion thereof as attachment portions to the reflector 14. Then, by fixing the leg portions 15*c* to the reflector 14, the light intercepting shade 15 is positioned relative to the effective reflecting surfaces 14*a*, 14*b* of the reflector 14, the discharge center of the discharge bulb 20 and the light intercepting portions (pinstripes) 5*a*, 5*b*.

Openings 15*b*1, 15*b*2 are provided in the light intercepting cylindrical portion 15*b* in such a manner as to correspond, respectively, to the first and second effective reflecting surfaces 14*a*, 14*b* of the reflector 14 (the first effective reflecting surface 14*a* which is extended horizontally and is mainly provided on an upper side of the center of the bulb inserting and attaching hole H, and the second effective reflecting surface 14*b* which is relatively small and is provided substantially right below the bulb inserting and attaching hole H). Then, as shown in FIG. 5, light emitted from the hermetically sealed glass envelope 3*a*, which functions as the discharge light emitting portion, is guided respectively to the first and second effective reflecting surfaces 14*a*, 14*b* of the reflector 14 via the openings 15*b*, 15*b*2, whereby a first light distribution pattern PA1 having the clear cut-off line CL (the 15-degree cut-off line CL1 and the horizontal cut-off line CL2) is formed by light L1 which is reflected by the first effective reflecting surface 14*a* and a second light distribution pattern PA2 which is largely diffused in the horizontal direction slightly below a horizontal position H-H, the dip beam light distribution pattern PA being thereby formed by combining both the light distribution patterns PAl, PA2 together.

Note that when the light intercepting shade 15 is fixed to the reflector 14 so as to be integrated as the light source unit U, left-hand and right-hand edges 15*b*3, 15*b*4 of the opening 15*b*1 are designed to be disposed in such a manner as to align with the clear cut-off line CL (the 15-degree cut-off line CL1 and the horizontal cut-off line CL2) forming light intercepting film (pinstripe) 5*a* which is provided on the outer surface of the shroud glass tube 5 to thereby provide a function to make the clear cut-off line CL (the 15-degree cut-off line CL1 and the horizontal cut-off line CL2) sharp.

Figure 17:
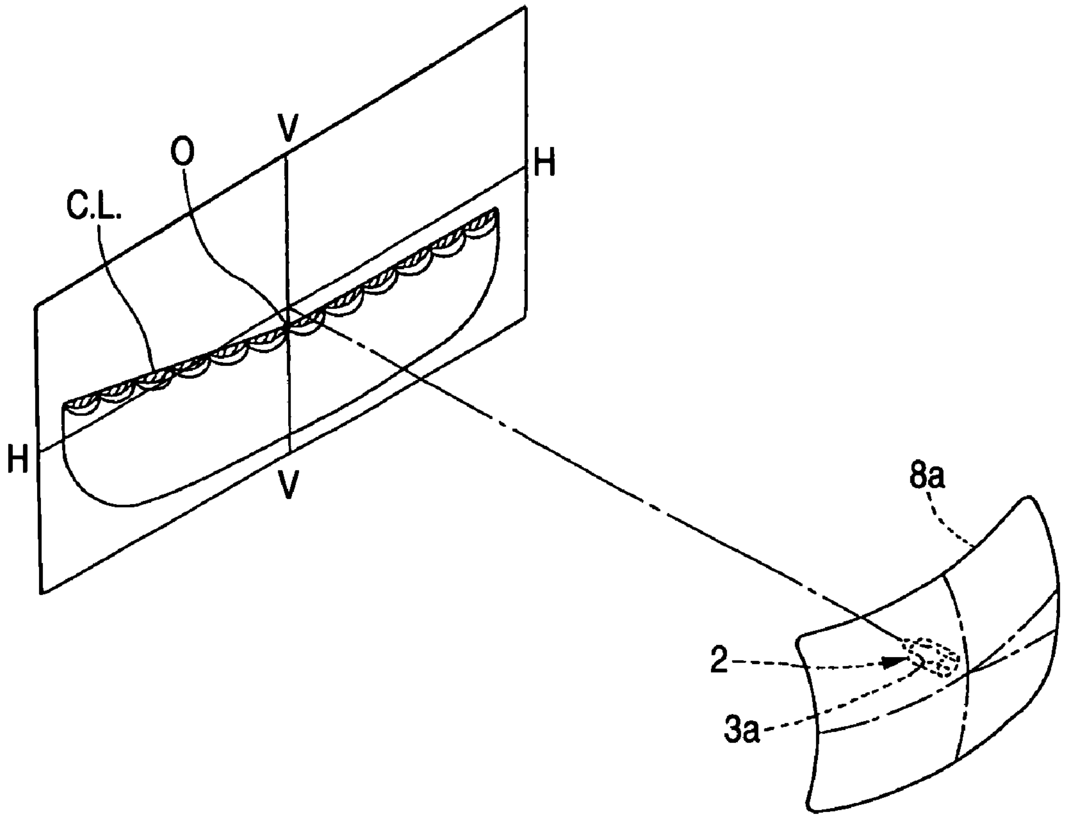
FIG. 17 is a perspective view showing a light distribution pattern formed by the reflector and the arc tube which constitutes the light source (a relationship between an arc of the arc tube and arc images projected on to a light distribution pattern in designing the light distribution of the reflector).
Figure 18:
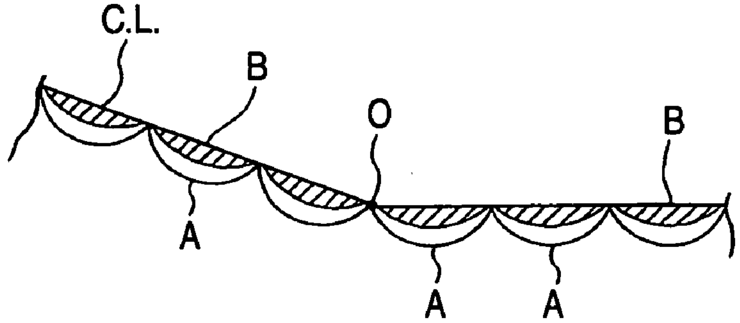
FIG. 18 is an enlarged view of arc images projected along the clear cut-off line.

Namely, as shown in FIGS. 1 and 2, the reflector 14 is made up of a plurality of effective reflecting surface elements 14*a*1 to 14*a*4, 14*b*1 having different curvatures which take as a reference plane a paraboloid of revolution that would be formed about the optical axis extending longitudinally which functions as a center axis. To be specific, the effective reflecting surfaces 14*a*, 14*b* (the respective reflecting surface elements 14*a*1 to 14*a*4, 14*b*1) of the reflector 14 are designed such that for example, as shown in FIG. 17, light source images (images of the arc which functions as the discharge light emitting portion of the arc tube 3) by the respective reflecting surface elements 14*a*1 to 14*a*4, 14*b*1 are projected on (affixed to) a light distribution screen in front of the reflector 14 in such a manner as to be arranged in a radial fashion about an elbow portion O of the clear cut-off line so that a predetermined distribution light quantity can be obtained by a predetermined light distribution pattern that is required for the headlight.

In addition, a frost treatment applied area 16 adapted to diffuse emitted light is provided, as shown in FIG. 8, in such a manner as to extend in a belt-like fashion at each of light emitting areas (areas extending along the pinstripes 5*a*, 5*b* which constitute the light intercepting portion) on the outer surface of the shroud glass tube 5 which correspond to the clear cut-off line CL (the 15-degree cut-off line CL1 and the horizontal cut-off line CL2) in the light distribution pattern PA. Note that the frost treatment means a process for forming embosses (satins) on the outer surface of the shroud glass tube 5 for diffusing emitted light by virtue of sand blasting, laser beam irradiation, chemical etching, heating, application of paint or the like.

Due to this, as shown enlarged in FIG. 7, any of curved arc images projected along the clear cut-off line CL (the 15-degree cut-off line CL1 and the horizontal cut-off line CL2) of the light distribution pattern is such as to be enlarged by the diffused light. Namely, any of the enlarged arc images A1 (indicated by broken lines in FIG. 7) is enlarged relative to the conventional arc images A (indicated by solid lines in FIG. 7) which are projected by only non-diffused light due to no frost treatment applied area 16 being provided, and a dark portion B1 appearing in a curved recess of the enlarged arc image A1 is made thin by such an extent that the width of each of the enlarged arc images A1 is increased relatively, whereby the area of the dark portion B1 is reduced, the clear cut-off line CL being thereby made to approach the straight state.

In addition, while, in the event that the area of the frost treatment applied area 16 becomes too wide, the rectilinear light transmission coefficient of the shroud glass tube 5 is reduced, leading to the reduction in the light emitting quantity of the discharge bulb 20 (the light distribution quantity as the headlight), since the frost treatment applied areas 16 are provided only at the light emitting areas (areas extending along the pinstripes 5*a*, 5*b*) on the outer surface of the shroud glass tube 5 which correspond to the areas extending along the clear cut-off lines CL1, CL2 in the light distribution pattern PA, only the light distribution quantity at the areas extending along the clear cut-off lines CL1, CL2 is slightly reduced, and hence there is caused no reduction in the light emitting quantity of the discharge bulb 20 (the light distribution quantity as the headlight) which affects visibility.

In addition, the arc images A1 projected along the clear cut-off line on the light distribution screen are made thick by such an extent that they are enlarged, and moreover, the light distribution quantity at the area extending along the clear cut-off line CL is slightly reduced, whereby the excessive sharpness of the clear cut-off line CL is relaxed, and therefore, even in case the arc is caused to oscillate due to vibrations generated while the vehicle is running, a light distribution oscillation in which the clear cut-off line CL oscillates vertically is made less noticeable.

In addition, as a diffusing power for the frost treatment applied area 16, a linear transmission coefficient of 30% to 80% is a desirable range. This is because, in case the linear transmission coefficient is less than 30%, there is caused a risk that the emitted light constitutes a secondary light source, whereby glare may be generated, whereas in case the linear transmission coefficient exceeds 80%, since the diffusion of emitted light is insufficient, the effectiveness in narrowing the dark portion on the curved recess side by enlarging the arc images becomes poor.

FIGS. 8A and 8B show drawings illustrating the position and size of the frost treatment applied area 16 provided on the shroud glass tube 5. FIG. 8A is a longitudinal sectional view of the arc tube main body. FIG. 8B is a cross-sectional view of the arc tube main body (a sectional view taken along the line (b)-(b) in FIG. 8A). While the frost treatment applied area 16 is, of course, provided at the light emitting areas on the outer surface of the shroud glass tube 5 which correspond to the area extending along the clear cut-off line CL, specific positions are set as will be described below.

In the first place, the frost treatment applied area 16 is preferably provided to extend between the facing electrodes 4, 4 in such a manner as to face square to the substantially longitudinal center portion of the curved recess of an arc a generated between the electrodes 4, 4. Namely, since areas where light is emitted toward the divided reflecting surfaces 14*a*1, 14*a*2 of the effective reflecting surface of the reflector 14 which project arc images along the clear cut-off line CL (CL1, CL2) of the light distribution pattern and the divided reflecting surfaces 14*a*1, 14*a*2 thereof reside on the left and right sides of the shroud glass tube 5 which substantially extends along the horizontal plane including a discharge axis Lo, in the event that the frost treatment applied area 16 is provided at the position which falls within the distance (position) between the electrodes 4, 4 which corresponds to a maximum longitudinal length of the arc a and which faces square to the substantially longitudinal center portion of the curved recess of the arc a in the transverse or horizontal direction, at least the curved recess side of the arc image that is projected along the clear cut-off line on the light distribution pattern is enlarged, whereby the width of the enlarged arc image A1 is increased relatively.

As a result, the linearity of the clear cut-off line CL (CL1, CL2) is enhanced, and the reduction in the rectilinear light transmission coefficient of the shroud glass tube 5 which occurs in association with unnecessary expansion of the frost treatment applied area 16 is suppressed, and the light emitting quantity of the discharge bulb 20 is reduced only slightly, whereby the securing of the linearity of the clear cut-off line CL (CL1, CL2) and the light distribution quantity in the light distribution pattern of the headlight can be attained effectively.

In the second place, since the luminance is high at a position among the arc a generated between the facing electrodes 4, 4 where the maximum luminance line 1*a* resides, the frost treatment applied area 16 is desirably provided to extend in such a manner as to face square the maximum luminance line 1*a* of the arc a.

With the frost treatment applied area 16 being regulated as has been described above, at least the location of the enlarged arc image A1 projected along the clear cut-off line CL on the light distribution screen which corresponds to the maximum luminance line is enlarged, the light quantity of the enlarged arc image A1 is smoothed out, whereby a further linearity of the clear cut-off line CL (CL1, CL2) in the light distribution of the headlight can be secured.

In the third place, the frost treatment applied area is desirably set to an angular width which is defined by its lower edge defined by at least the position on the shroud glass tube 5 which corresponds to the clear cut-off line CL (CL1, CL2) (the positions of the pinstripes 5*a*, 5*b* which are the light intercepting films) and its upper edge situated 3 degrees or greater and 20 degrees or smaller upward circumferentially from the lower edge.

In the event that the upper edge position of the frost treatment applied area 16 exceeds the upper limit of 20 degrees, the light distribution quantity at an area which exceeds the area extending along the clear cut-off line CL (CL1, CL2) is reduced by such an extent that the area of the frost treatment applied area 16 is increased, and visibility is reduced. On the other hand, in the event that the upper edge position of the frost treatment applied area 16 is smaller than the lower limit of 3 degrees, the whole of the arc image that is projected along the clear cut-off line CL (CL1, CL2) of the light distribution pattern (in particular, the curved recess side of the enlarged arc image) is not enlarged sufficiently, and the width of each enlarged arc image is not increased so much, there being provided no effectiveness in making the clear cut-off line approach the straight state.

In addition, since light emitted from a position below the position on the shroud glass tube 5 which corresponds to the clear cut-off line is light that is intercepted by the light intercepting films (pinstripes) 5*a*, 5*b* and/or the light intercepting shade 15 so as not to contribute at all to the formation of the light distribution of the headlight, while there is caused no problem even in case the lower edge of the frost treatment applied area 16 is made to be situated below the clear cut-off line corresponding position on the shroud glass tube 5, the area needing the frost treatment can be reduced by making the lower edge of the frost treatment applied area 16 coincide with the light intercepting films (pinstripes) 5*a*, 5*b*.

In the fourth place, the frost treatment applied area 16 is desirably provided on both left and right sides of the shroud glass tube 5 to the same angular width θ in the circumferential direction.

With the frost treatment applied area 16 being regulated as has been described above, the discharge bulb 20, which is applied to the headlight specified by the light distribution pattern for left-hand traffic according to the embodiment of the invention, can be used for a headlight specified by a light distribution pattern for right-hand traffic.

Namely, while a headlight specified by a light distribution for left-hand traffic and a headlight specified by a light distribution for right-hand traffic differ from each other in the form (shape) of the light intercepting films (stripes) 5*a*, 5*b* and/or the light intercepting shade 15 for forming a clear cut-off line such that clear cut-off lines CL (CL1, CL2) of the light distribution patterns of the respective headlights become symmetrical transversely, since the frost treatment applied areas 16 provided on both the left and right sides of the shroud glass tube 5 have the same circumferential angular widths θ, a discharge bulb 20 inserting and attaching position relative to a bulb inserting and attaching hole in the headlight specified by the light distribution for right-hand traffic is made to be inserted and attached to a position which is shifted apart from the bulb inserting and attaching position for the headlight specified by the light distribution for left-hand traffic through a predetermined angle in the circumferential direction (in the bulb inserting and attaching hole for the headlight specified by the light distribution for right-hand traffic, the light intercepting film 5*a* which is situated on the left-hand side when viewing the headlight from the front thereof (on the right-hand side when viewing the bulb from the rear thereof) is positioned to be situated horizontally, and the light intercepting film 5*b* which is situated on the right-hand side in the same condition (on the left-hand side when viewing the bulb from the rear thereof) is positioned to be situated 15 degrees downward), whereby the discharge bulb of the invention can also be used on the headlight specified by the light distribution for right-hand side traffic.

In the fifth place, as shown by imaginary lines (reference numeral 17) in FIG. 8A and denoted by reference numeral 17 under Specification 4 in FIGS. 9A4 and 9B4, a frost treatment applied area 17 which performs a similar emitted light diffusing function to that performed by the frost treatment applied area 16 is also provided at a light emitting area on the outer surface of the shroud glass tube 5 which faces circumferentially square to an arc spot appearing at the distal end of the electrode 4 in the form of a belt having a predetermined width.

With the frost treatment applied area 17 being regulated as has been described right above, while the location referred to as the arc spot where the luminance becomes very high appears at the distal end of each of the facing electrodes 4, 4 at the time of arc discharge, since light emitted from the light emitting area (the frost treatment applied area) 17 on the shroud glass tube 5 which faces square to the arc spot is diffused, arc sport portions of all the arc images projected on the light distribution screen are enlarged, and the luminance thereof is reduced, the arc spot portions becoming less noticeable in the light distribution pattern, whereby the resulting light distribution is free from light distribution irregularities.

In addition, since the frost treatment applied area 17 which functions to enlarge the arc spots of the arc images projected on the light distribution screen is limited to the area on the outer surface of the shroud glass tube 5 which faces circumferentially square to the arc spot appearing at the distal end of each of the electrodes 4, only the light distribution quantity at the arc spot locations of all the arc images projected on the light distribution screen is reduced, and there is caused no reduction in the light emitting quantity of the discharge bulb 20 (the light distribution quantity of the headlight) which affects visibility.

FIGS. 9A1 to 9B4 show drawings illustrating Specifications 1 to 4 having frost treatment applied areas 16 which are different from one another in position and size, and in any of Specifications 1 to 4, a frost treatment applied area 16 is provided at only a light emitting area on the shroud glass tube 5 which corresponds to an area extending along the clear cut-off line CL (CL1, CL2) in the light distribution pattern. When extended flat, the frost treatment applied area 16 of any of the specifications is formed into a rectangular shape and is provided at a central position between the facing electrodes 4, 4 (which are spaced apart a distance of 4.2 mm) in such a manner that the position of its lower edge coincides with an upper edge of the light intercepting film (pinstripe) 5*a*. Furthermore, in Specification 4, a frost treatment applied area 17 is also provided at a light emitting are on the outer surface of the shroud glass tube 5 which corresponds to an arc spot at a distal end of each of the electrodes 4.

Then, in Specification 1, the longitudinal length of the frost treatment applied area 16 is 1.0 mm, and the frost treatment applied area 16 is provided to an angular width of 18 degrees as measured circumferentially where an upper edge of the frost treatment applied area 16 is below the maximum luminance line.

In Specification 2, the longitudinal length of the frost treatment applied area 16 is 1.0 mm, and the frost treatment applied area 16 is provided to an angular width of 18 degrees as measured circumferentially where an upper edge of the frost treatment applied area 16 is brought into contact with a maximum protuberant portion of the arc curvature.

In Specification 3, the longitudinal length of the frost treatment applied area 16 is 2.5 mm, and the frost treatment applied area 16 is provided to an angular width of 18 degrees as measured circumferentially where an upper edge of the frost treatment applied area 16 is brought into contact with a maximum protuberant portion of the arc curvature.

In Specification 4, the longitudinal length of the frost treatment applied area 16 is 3.8 mm, and the frost treatment applied area 16 is provided to an angular width of 18 degrees as measured circumferentially where an upper edge of the frost treatment applied area 16 is brought into contact with a maximum protuberant portion of the arc curvature. Furthermore, the frost treatment applied areas 17 are also provided at the areas which circumferentially face square the arc spots in such a manner as to connect to the pair of left and right frost treatment applied areas 16. Namely, the frost treatment applied area 17 is provided in the form of a belt whose upper edge position coincides with the upper edges of the left and right light intercepting films (pinstripes) 5*a*, 5*b* and which connects to the pair of left and right frost treatment applied areas 16.

Then, FIG. 10 shows data resulting from measurement of diffusing power (mm) and bending (mm) from the shapes of arc images in the area along the clear cut-off line CL (CL1, CL2) in the light distribution pattern by irradiating on to the light distribution screen light distribution patterns of headlights in which a discharge bulb incorporating therein the conventional arc tube to which no frost treatment was applied and arc tube discharge bulbs incorporating therein the arc tubes of Specifications 1 to 4, respectively, were installed as light sources.

As to bending of arc image, in any of Specifications 1 to 4, while there is found little difference between the conventional example and the examples according to the invention, as to diffusing power of arc image, it is found that the diffusing power of any of Specifications 1 to 4 is higher than that of the conventional example and that in particular, the diffusing power of Specification 4 is the highest.

FIG. 11 shows data resulting from measurement of light distribution performance (maximum luminous intensity, maximum light intensity position, effective usable luminous flux) by irradiating on to the light distribution screen light distribution patterns of headlights in which a discharge bulb incorporating therein the conventional arc tube to which no frost treatment was applied and arc tube discharge bulbs incorporating therein the arc tubes of Specifications 1 to 4, respectively, were installed as light sources.

As to maximum luminous intensity, while, in any of Specifications 1 to 4, the luminous intensity is reduced when compared with the conventional example in which no frost treatment was applied, the resulting maximum reduction is only 1% of a very large luminous intensity of 19322 cd and hence constitutes no problem from the light distribution point of view. In addition, as to maximum luminous intensity position, while the maximum luminous intensity position is shifted slightly leftward and downward (maximum about 10% downward, maximum about 5% leftward), this causes no problem from the light distribution point of view. In addition, as to a predetermined range of effective usable luminous flux, the resulting maximum increase is only 4%, and hence this causes no problem with respect to light distribution.

FIGS. 12, 13, 14 show results of evaluation of visibility tests carried out on 10 people regarding whether or not they had noticed dark portion in a clear cut-off line, light distribution oscillation and light distribution irregularity by irradiating on to the light distribution screen light distribution patterns of headlights in which a discharge bulb incorporating therein the conventional arc tube to which no frost treatment was applied and arc tube discharge bulbs incorporating therein the arc tubes of Specifications 1 to 4, respectively, were installed as light sources.

As to dark portion in the clear cut-off line CL (CL1, CL2), as shown in FIG. 12, many noticed the dark portions in the conventional example in which no frost treatment was applied, whereas none of them noticed the dark portions in any of Specifications 1 to 4. In addition, the results of evaluation of Specifications 2 to 4 were almost the same.

As to light distribution oscillation, as shown in FIG. 13, many noticed the light distribution oscillation in the conventional example in which no frost treatment was applied, whereas none of them noticed the light distribution oscillation in any of Specifications 1 to 4. In particular, Specifications 3, 4 obtained good evaluation results.

As to light distribution irregularity, as shown in FIG. 14, Specification 1 and the conventional example in which no frost treatment was applied obtained low evaluation results which were almost the same. Then, the specifications with the larger frost treatment applied areas obtained higher evaluation results, and Specification 4, in which the frost treatment applied areas were also provided at the areas which face square to the arc spots, obtained the best evaluation results. In addition, in Specification 4, while the frost treatment applied areas 17 connect to the frost treatment applied areas 16 in the width of 0.4 mm, also in a form in which frost treatment applied areas 17 connect to central frost treatment applied areas 16 (whose longitudinal length is 3.8 mm) with the width of the frost treatment applied areas 17 being 0.2 mm at the electrodes (the side edge of the frost treatment applied area 17 contacts the distal end of the electrode 4), results of evaluation obtained on light distribution irregularity were almost the same as those of Specification 4.

Note that while in the embodiment, the light intercepting portion which forms the predetermined clear cut-off line CL (CL1, CL2) is made to be constituted by both the light intercepting films (pinstripes) 5*a*, 5*b* which are provided on the outer surface of the shroud glass tube 5 and the metallic light intercepting shade 15 which encloses the arc tube main body, the light intercepting portion which forms the predetermined clear cut-off line CL (CL1, CL2) may be constituted by only the light intercepting films (pinstripes) 5*a*, 5*b* which are provided on the outer surface of the shroud glass tube 5. In this case, since the metallic light intercepting shade 15 is used only to cut off direct light attempting to travel forward and light attempting to travel toward other destinations than the effective reflecting surfaces 14*a*, 14*b* of the reflector 14, there is no need to form the metallic light intercepting shade 15 in such a manner as to be aligned with the light intercepting films 5*a*, 5*b* which correspond to the clear cut-off line CL (CL1, CL2).

In addition, although not in general, the light intercepting portion which forms the predetermined clear cut-off line CL (CL1, CL2) may be made up of only the metallic light intercepting shade 15 which encloses the arc tube main body.

Additionally, while in the embodiment, the discharge bulb 20 has been described as including the mercury-free arc tube in which no mercury is sealed in the hermetically sealed glass envelope 3*a*, it goes without saying that the invention can, of course, be applied similarly to a discharge bulb including a mercury-sealed-in arc tube in which mercury is sealed in the hermetically sealed glass envelope 3*a*.

According to the automotive headlight discharge bulb according to one or more embodiments of the invention, the first problem that the clear cut-off line of the light distribution of the headlight does not become straight, thereby deteriorating the visibility and the second problem that the visibility is deteriorated by the distribution light oscillation in which the clear cut-off line oscillates vertically can be solved, respectively, and the invention can contribute to the safety running of the vehicle.

In addition, since the linearity of the clear cut-off line in the light distribution of the headlight and the securing of light distribution quantity are attained effectively, the invention can contribute further to the safety running of the vehicle.

In addition, a further linearity of the clear cut-off ling in the light distribution of the headlight is ensured, the invention can further more contribute to the safety running of the vehicle.

In addition, since the light distribution quantity is not reduced in the other areas than the area extending along the clear cut-off line of the light distribution pattern, the visibility that is to be provided by the headlight is provided in an ensured fashion, and the frosting process can be facilitated by such an extent that the area needing the frost treatment is reduced.

In addition, since the discharge bulb of the invention can be used commonly to both the headlight specified by the light distribution pattern for left-hand traffic and the headlight specified by the light distribution pattern for right-hand traffic specification, the necessity of preparing discharge bulbs to the respective specifications can be obviated, thereby making it possible to provide discharge bulbs at low costs.

In addition, the first problem that the clear cut-off line of the light distribution of the headlight does not become straight, thereby deteriorating the visibility, the second problem that the visibility is deteriorated by the distribution light oscillation in which the clear cut-off line oscillates vertically, and a third problem that the noticeable or visible light distribution irregularities deteriorate visibility can be solved, respectively, and hence the invention can contribute to the safety running of the vehicle in an ensured fashion.

In addition, the third problem that the noticeable or visible light distribution irregularities deteriorate visibility can be solved, and hence the invention can contribute to the safety running of the vehicle.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An automotive headlight discharge bulb comprising:

an arc tube having a hermetically sealed glass envelope as a discharge light emitting portion where electrodes are provided in such a manner as to face each other; and a cylindrical shroud glass tube that covers the arc tube, wherein a frost treatment is applied to an area on an outer surface of the shroud glass tube, the automotive headlight discharge bulb is configured so that a light distribution pattern having a predetermined clear cut-off line is formed by a light intercepting portion and a light distribution control reflector when the automotive headlight discharge bulb is used as a light source of an automotive headlight, and the frost treatment is applied to only a light emitting area on the outer surface of the shroud glass tube which corresponds to an area along the clear cut-off line in the light distribution pattern.

2. The automotive headlight discharge bulb according to claim 1, wherein at least one part of the area to which the frost treatment is applied extends so as to face a substantially longitudinal center portion of a curved concavity of an arc generated between the electrodes.

3. The automotive headlight discharge bulb according to claim 1, wherein at least one part of the area to which the frost treatment is applied extends so as to face a maximum luminance line of an arc generated between the electrodes.

4. The automotive headlight discharge bulb according to claim 1, wherein the area to which the frost treatment is applied is provided to an angular width which is defined by its lower edge defined by a position on the shroud glass tube which corresponds to a clear cut-off line and its upper edge situated from 3 to 20 degrees circumferentially upward from the lower edge.

5. The automotive headlight discharge bulb according to claim 1, wherein the area to which the frost treatment is applied is on both left and right sides of the shroud glass tube to the same angular width in the circumferential direction.

6. The automotive headlight discharge bulb according to claim 1, wherein a frost treatment is also applied to a light emitting area on an outer surface of the shroud glass tube which circumferentially faces to an arc spot appearing at distal ends of the electrodes.

7. An automotive headlight discharge bulb comprising:

an arc tube having a hermetically sealed glass envelope as a discharge light emitting portion where electrodes are provided in such a manner as to face each other; and a cylindrical shroud glass tube which covers the arc tube, wherein the automotive headlight discharge bulb is configured so that a light distribution pattern having a predetermined clear cut-off line is formed by a light intercepting portion and a light distribution control reflector when the automotive headlight discharge bulb is used as a light source of an automotive headlight, and a frost treatment is applied to only a light emitting area on an outer surface of the shroud glass tube which circumferentially faces to an arc spot appearing at a distal end of each of the electrodes.

* * * * *